United States Patent [19]
Park et al.

[11] Patent Number: 5,804,904
[45] Date of Patent: Sep. 8, 1998

[54] BRUSHLESS DC MOTOR AND A METHOD OF GENERATION POWER THEREWITH

[75] Inventors: No-yeol Park, Suwon; Seong-man Jang, Anyang; Gun-hee Jang, 308-801 Mugunghwa Kyungnam Apt., Shinchon-dong, Dongan-gu, Anyang, Kyungki-do; Jin-yook Yoon, Seoul, all of Rep. of Korea

[73] Assignees: Samsung Electronics Co., Ltd.; Gun-hee Jang, both of Kyungki-do, Rep. of Korea

[21] Appl. No.: 784,869

[22] Filed: Jan. 16, 1997

[30] Foreign Application Priority Data

Jan. 18, 1996 [KR] Rep. of Korea ..................... 1996 1021

[51] Int. Cl.⁶ ..................................................... H02K 1/22
[52] U.S. Cl. .......................... 310/261; 310/156; 310/254; 310/258; 310/179; 310/180
[58] Field of Search ..................... 310/261, 258, 310/156, 254; 360/99.08, 99

[56] References Cited

U.S. PATENT DOCUMENTS

| | | | |
|---|---|---|---|
| Re. 33,628 | 7/1991 | Hahn | 310/268 |
| 4,437,029 | 3/1984 | Ban et al. | 310/198 |
| 4,447,751 | 5/1984 | Ban et al. | 310/154 |
| 4,551,645 | 11/1985 | Takahashi et al. | 310/46 |
| 4,583,016 | 4/1986 | Ban et al. | 310/198 |
| 4,752,707 | 6/1988 | Morrill | 310/184 |
| 4,847,712 | 7/1989 | Crapo | 360/99.08 |
| 4,896,063 | 1/1990 | Roberts | 310/68 R |
| 5,164,622 | 11/1992 | Kordik | 310/67 R |

*Primary Examiner*—Thomas M. Dougherty
*Assistant Examiner*—Elvin G. Enad
*Attorney, Agent, or Firm*—Lowe Hauptman Gopstein Gilman & Berner

[57] ABSTRACT

An improved 10-pole 9-slot brushless DC motor used as a spindle motor used in devices, such as a computer hard disk driver or a laser scanner, is provided which reduces cogging torque and improves driving torque. The motor includes a field magnet having an annular permanent magnet which is formed of 10 magnetic poles attached to each other in a radial orientation, for generating a flux field and an armature formed by winding an armature core formed of nine slots and nine salient-poles with windings connected in three phases. Also, the field magnet of the motor is rotated by the rotating magnetic field generated by the armature windings. Since the motor has a short cycle and low cogging torque, the motor is very stable. Also, torque ripple is low and the torque characteristics as a whole are improved, thus achieving high efficiency.

15 Claims, 6 Drawing Sheets

BRUSHLESS DC MOTOR AND A METHOD OF GENERATION POWER THEREWITH

BACKGROUND OF THE INVENTION

The present invention relates to a brushless direct current (DC) motor used as a spindle motor in devices, such as a hard disk drive for a computer or a laser scanner, and more particularly, to a brushless DC motor having a low cogging torque and, at the same time, improved torque characteristics.

The spindle motor used in hard disk drives or laser scanners is required to operate at high speeds, be small in size, and very precise. In particular, in the case of the hard disk drive, the recording data spacing on a disk becomes narrow according to the recent high-density trend, and thus repeatable/non-repeatable run-out become a serious problem due to the vibration of the spindle motor for driving a hard disk. In order to meet these requirements, the spindle motor is required to have a low cogging torque and, simultaneously, be highly efficient. However, the prior art does not satisfy both requirements.

Figure 1:
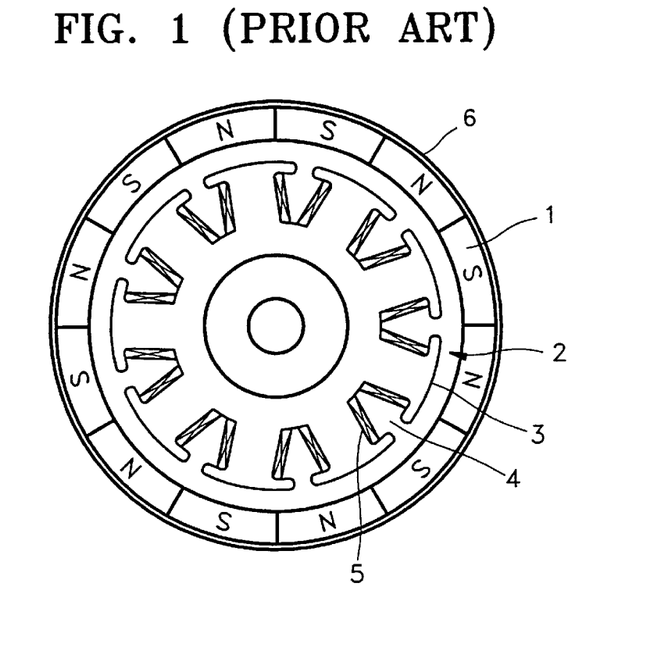
FIG. 1 is a plan view of a conventional 12-pole 9-slot brushless DC motor.

For example, a 12-pole 9-slot brushless DC motor usually used as a spindle motor comprises, as shown in FIG. 1, a field magnet 1 for generating a flux field, having twelve N and S magnetic poles alternately bonded in a radial orientation, an armature core 2 formed by alternately arranging nine salient-poles 3 and slots 4, nine armature windings 5 wound around each salient-pole 3, and a field yoke 6 surrounding the outer perimeter of the field magnet 1.

Figure 2:
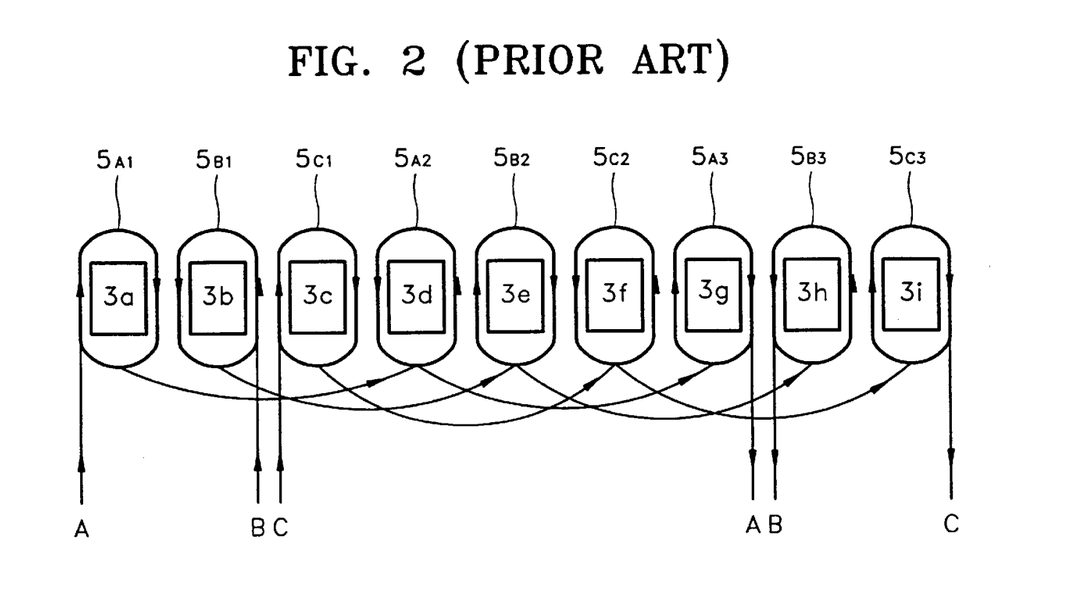
FIG. 2 is a connection diagram of armature windings of the motor shown in FIG. 1.

The nine armature windings 5 are divided into three groups, and connected to each other to apply differing phase voltages to the respective groups. Referring to the connection diagram of FIG. 2, windings $5_{A1}$, $5_{A2}$ and $5_{A3}$ to which phase voltage A is applied are sequentially wound around first, fourth and seventh salient-poles $3a$, $3d$ and $3g$, windings $5_{B1}$, $5_{B2}$, and $5_{B3}$ to which phase voltage B is applied are sequentially wound around second, fifth and eighth salient-poles $3b$, $3e$ and $3h$, and the remaining windings $5_{C1}$, $5_{C2}$ and $5_{C3}$ to which phase voltage C is applied are sequentially wound around third, sixth and ninth salient-poles $3c$, $3f$ and $3i$. That is, as these armature windings sequentially generate rotating magnetic fields, torque is created between the flux passing between the rotating magnetic fields and the poles of the field magnet 1, and the field magnet 1 is rotated with respect to the armature core 2 together with the field yoke 6 by means of the generated torque.

In this conventional brushless DC motor, the torque is generally dependent on the magnetic forces of the permanent magnet for generating the flux field. The problem is that cogging torque increases with an increase in torque, thereby enlarging torque ripple.

The cycle of a cogging torque in degrees (°) is expressed as:

$$C_{T_c} = \frac{360°}{\text{the } L.C.M. \text{ of } MP_n \text{ and } S_n}$$

wherein C denotes the cycle, $T_c$ denotes cogging torque, L.C.M. denotes the least common multiple and $MP_n$ and $S_n$ denote the number of magnetic poles and slots, respectively. Under identical magnetic conditions of the field magnet, when the cogging torque cycle is long, considerable energy is required during one cycle, thus increasing the cogging torque; and, if the cycle is short, the cogging torque decreases. Accordingly, in the prior art, the cogging torque cycle was shortened by forming auxiliary slots on the salient-poles of the armature core or auxiliary salient-poles on the slots thereof, which resulted in a reduction in the cogging torque. However, the formation of auxiliary slots or auxiliary salient-poles involves a difficult process, and the coil winding becomes very complicated.

Figure 3:
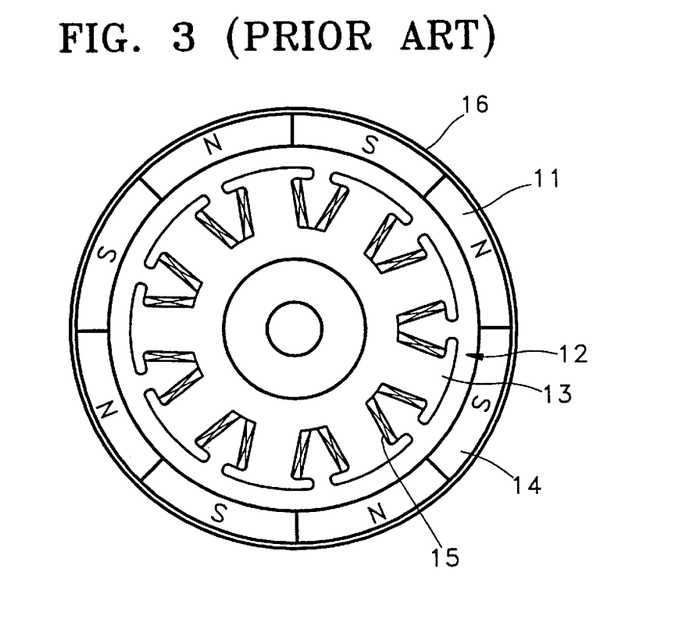
FIG. 3 is a plan view of a conventional 8-pole 9-slot brushless DC motor.
Figure 4:
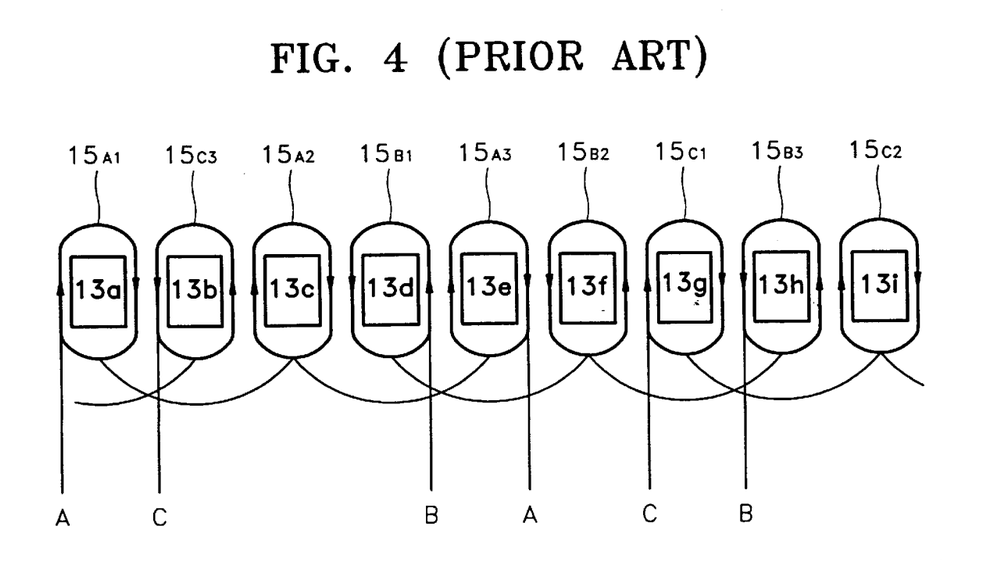
FIG. 4 is a connection diagram of armature windings of the motor shown in FIG. 3.
Figure 9:
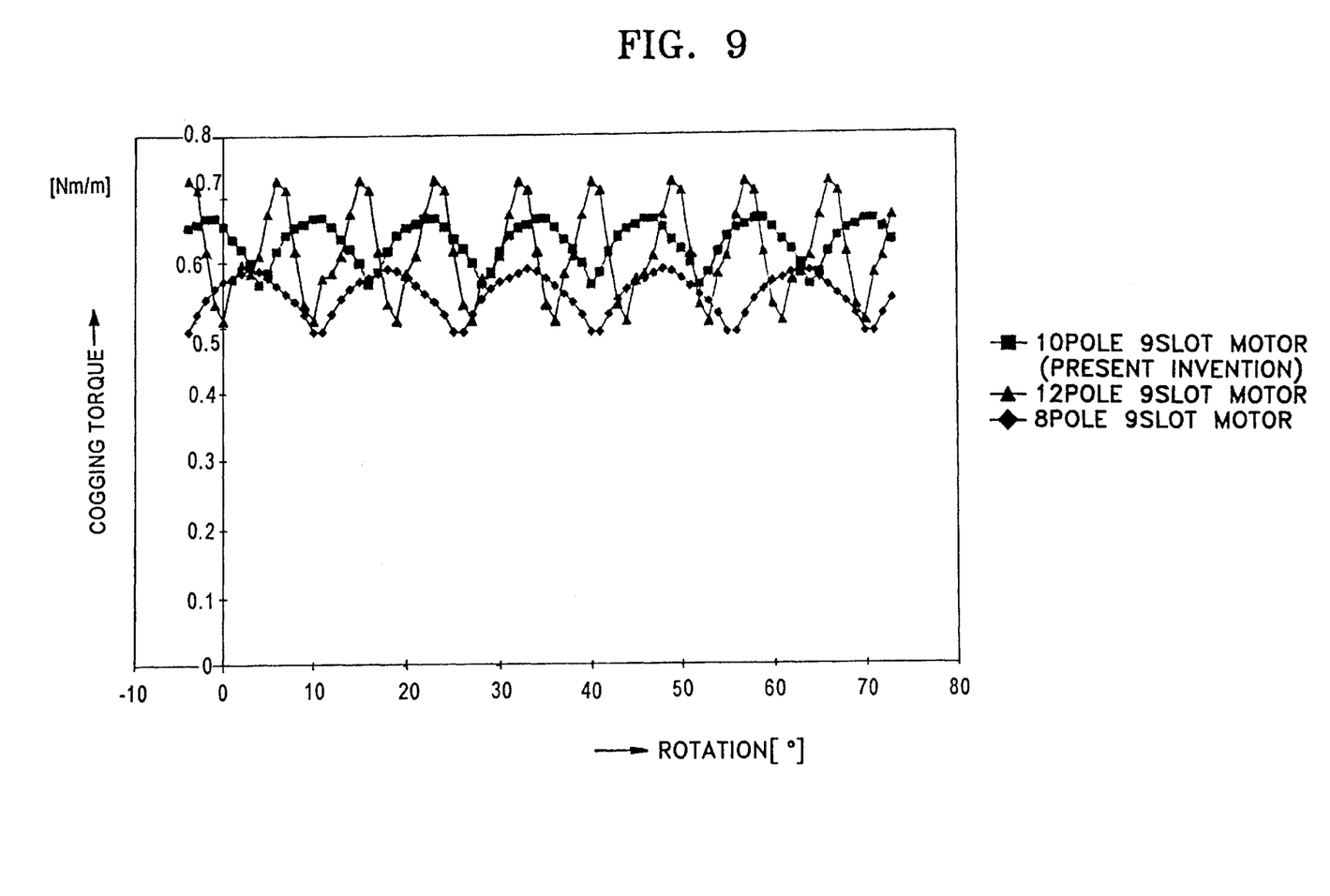
FIG. 9 is a graph showing a comparison of torque characteristics of the brushless DC motor according to the present invention with that of the conventional motors.

In another example disclosed in U.S. Pat. No. 4,847,712, shown in FIG. 3, a spindle motor having low cogging torque is proposed in which the spindle motor is an eight-pole nine-slot brushless DC motor including a field magnet 11 having eight poles, an armature core 12 having nine salient-poles 13 and slots 14, nine armature windings 15 divided into A, B and C phases and wound around each salient-pole 13, which are connected to each other as shown in FIG. 4. Thus, the cogging torque cycle is shortened by as much as half of the 10° of that of the 12-pole 9-slot motor, and the value of the cogging torque is also greatly reduced. However, as shown in FIG. 9, with the reduction of cogging torque, the torque performance degrades so that its efficiency is reduced by 10 to 20% as compared to that of the 12-pole 9-slot motor.

SUMMARY OF THE INVENTION

It is an object of the present invention to provide an improved brushless DC motor having low-cogging torque and high efficiency which improves torque performance without transforming the shape of the motor by forming additional auxiliary slots or salient-poles on an armature core.

To accomplish the above object, there is provided a brushless DC motor which generates power from the torque generated between a flux field and a rotating magnetic field, comprising: means for generating the flux field; and means for forming the rotating magnetic field with respect to the flux field, wherein the means for generating the flux field includes an annular field magnet having ten magnetic poles alternately arranged in a ring-shaped form along a circumferential orientation and magnetically bonded to each other in a radial orientation, each having an opposing polarity and the means for forming the rotating magnetic field includes an armature core having nine salient-poles at regular intervals from the circumference opposing the surface of the magnetic pole of the field magnet, and nine slots each formed between the adjacent salient-poles, and a plurality of armature windings wound around each salient pole which is wound with at least one armature winding.

Also, it is preferable that the plurality of armature windings are divided into three groups of windings wound around three consecutive salient-poles of the armature core, and connected in three phases to permit voltages of different phases to be applied to the respective groups.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 5:
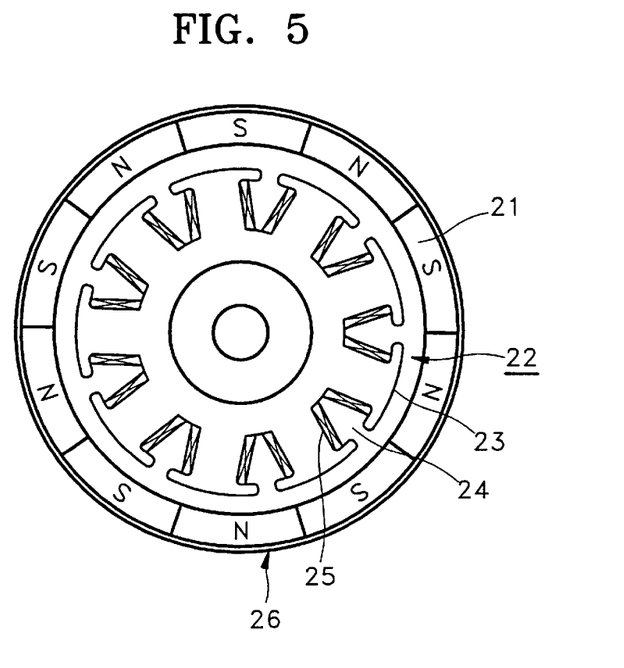
FIG. 5 is a plan view of a 10-pole 9-slot brushless DC motor according to the present invention.
Figure 6:
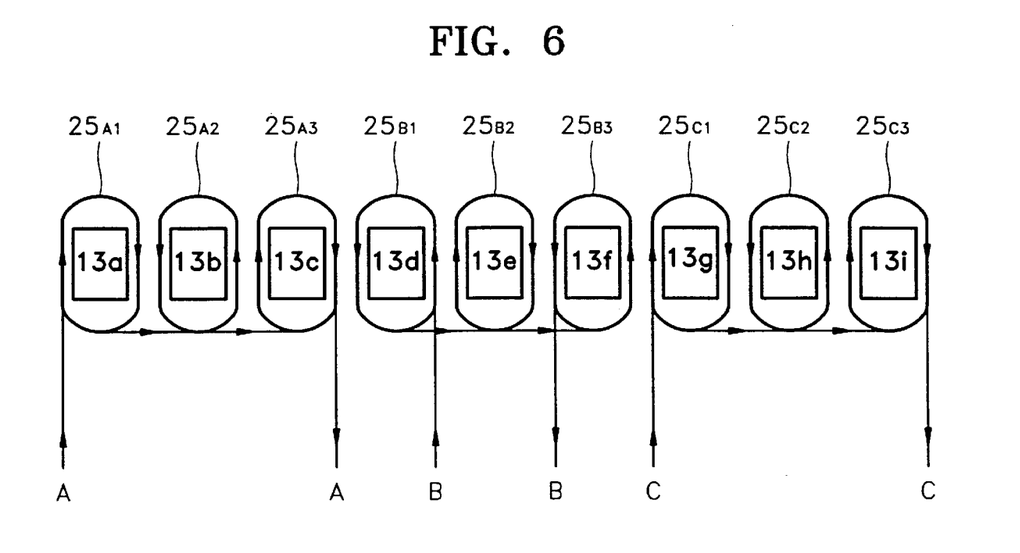
FIG. 6 is a connection diagram of armature windings of the motor shown in FIG. 5.
Figure 7:
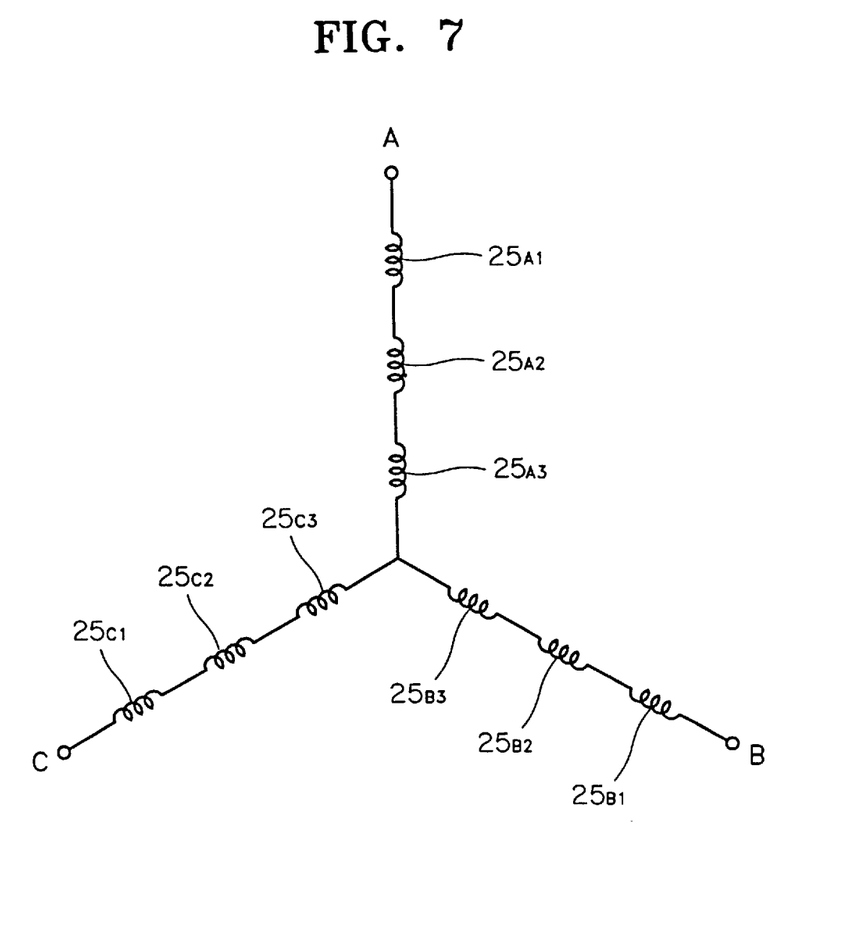
FIG. 7 is an equivalent circuit view of the armature windings of the motor shown in FIG. 5.

A brushless DC motor according to an embodiment of the present invention which is shown in FIG. 5 is constituted by 10 poles and 9 slots, in which the number of windings around each salient pole is 57 turns, the width of a tooth is 3.6 mm, a torque constant is 139.6 cm/A, a line resistance between A to B, B to C or C to A shown in FIG. 7 is 5.50Ω, the lines are connected as shown in FIG. 6, and each pole is made by magnetizing the material of NEOM10 with the capacitance of 200 μF and the voltage of 1200V.

Referring to FIG. 5, a 10-pole 9-slot brushless DC motor according to the present invention includes an annular field magnet 21 having ten magnetic poles, as a means for generating a flux field, an armature core 22 formed of nine salient-poles 23 and nine slots 24, which function as a means for forming rotating magnetic fields, nine armature windings 25 wound around the nine salient-poles 23, and a field yoke 26 surrounding the outer perimeter of the field magnet 21. Here, the field magnet 21 is a permanent annular magnet which is formed by arranging ten magnets of the same size in a circumferential orientation. The ten magnets are attached to each other so that the N and S poles are alternating. The field magnet 21 is attached to the field yoke 26 and rotates with the field yoke.

Referring to the connection diagram in FIG. 6, the nine armature windings are divided into three groups: the first group is comprised of windings $25_{A1}$, $25_{A2}$ and $25_{A3}$ wound around the first three salient-poles 23a, 23b and 23c, the second group is comprised of windings $25_{B1}$, $25_{B2}$ and $25_{B3}$ wound around the next three salient-poles 23d, 23e and 23f, and the last group is comprised of windings $25_{C1}$, $25_{C2}$ and $25_{C3}$ wound around the last three salient-poles 23g, 23h and 23i. Here, differing-phase voltages A, B and C are applied to the respective groups. Also, referring to FIG. 7, windings $25_{A1}$, $25_{A2}$ and $25_{A3}$, $25_{B1}$, $25_{B2}$ and $25_{B3}$ and $25_{C1}$, $25_{C2}$ and $25_{C3}$ to which phases A, B and C are respectively applied are formed in a three-phase Y-connection.

The above 10 pole 9 slot brushless DC motor according to the present invention is driven by a driving circuit (not shown) constituted by a diode and a thyristor, as in the prior art. Also, in order for the motor to rotate smoothly, the present invention detects the position of a rotor (field magnet) by means of a counter electromotive force waveform induced from each winding upon rotation of the motor, and commutates the direction of current flowing in the coils of each phase whenever the rotor rotates a 12° interval.

The phase to which current should initially be provided for starting the rotation of the motor is different depending on the position of the rotor. That is, if the current is initially provided from phase A to phase B, the next current is provided from phase A to phase C, then from phase B to phase C, then from phase B to phase A, then from phase C to phase A, then from phase C to phase B, and then from phase A to phase B.

Figure 8:
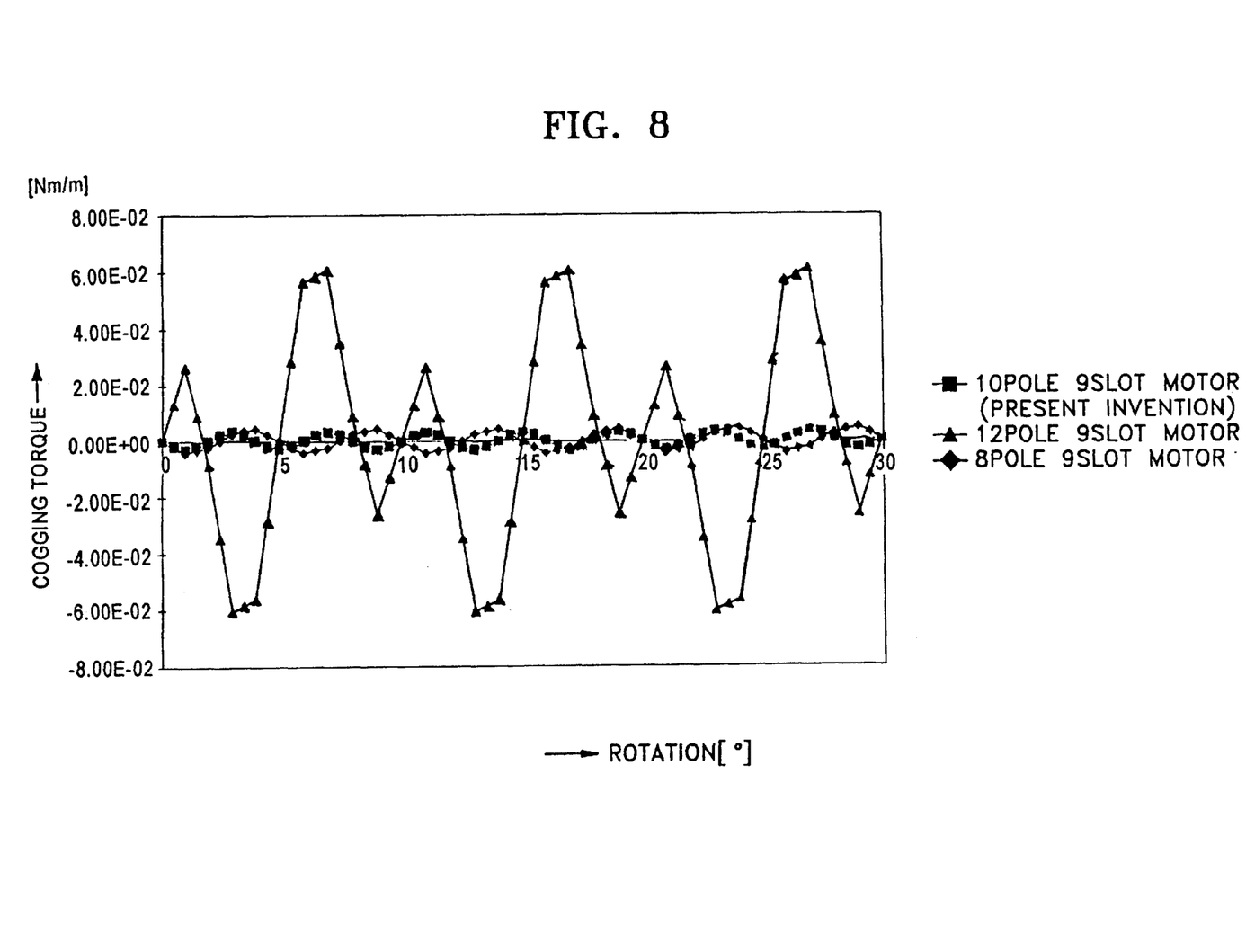
FIG. 8 is a graph showing a comparison of cogging torque characteristics of the brushless DC motor according to the present invention with that of the conventional brushless DC motors.

The results of employing the 10-pole 9-slot brushless DC motor as a spindle motor used in a hard disk drive, the cogging torque and the overall torque characteristics are described in FIGS. 8 and 9, respectively, with the characteristics of the conventional 12-pole 9-slot and 8-pole 9-slot motors. The values of the graphs can be expressed numerically by Tables 1 and 2.

TABLE 1

| Cogging Torque Characteristics | | | |
|---|---|---|---|
| Cogging Torque | 10-pole 9-slot Motor | 12-pole 9-slot Motor | 8-pole 9-slot Motor |
| Cycle | 4° | 10° | 5° |
| Maximum [Nm/m] | 0.0031 | 0.0605 | 0.0043 |

TABLE 2

| Driving Torque Characteristics | | | |
|---|---|---|---|
| Driving Torque | 10-pole 9-slot Motor | 12-pole 9-slot Motor | 8-pole 9-slot Motor |
| Average [Nm/m] | 0.6293 | 0.6133 | 0.5507 |

Referring to TABLE. 1, in the 10-pole 9-slot brushless DC motor according to the present invention, the cycle of the cogging torque is shortened to 40°. Thus, the frequency of the cogging torque increases such that it has no influence on the system having a relatively low-frequency working environment. Thus, stability is enhanced due to reduced vibration upon driving. Also, it is not significant that the average value of the cogging torque becomes 0 during one rotation of the rotor. From comparing the values in Table 1, the maximum cogging torque of the 10-pole 9-slot brushless DC motor according to the present invention is reduced significantly over those of the conventional 12-pole 9-slot and 8-pole 9-slot motors.

Also, in view of the overall torque characteristics, the 10-pole 9-slot brushless DC motor according to the present invention has a torque ripple characteristic similar to that of the conventional 8-pole 9-slot motor. However, as shown in TABLE. 2, the average torque of the present invention is larger than that of the conventional 8-pole 9-slot motor, which proves the present invention to be highly efficient.

As described above, the present invention provides a highly-efficient brushless DC motor having improved overall torque characteristics in spite of having low cogging torque. Also, this motor used as a spindle motor, in devices such as a hard disk drive or laser scanner, sufficiently satisfies the requirements of a spindle motor and also contributes to the enhanced stability of the system. In addition, the present invention makes the brushless DC motor very practical.

The present invention is not limited to the example described above and shown in the drawings, and it is apparent that changes and transformation may be effected within the following scope of the claims.

What is claimed is:

1. A brushless DC motor which generates power from the torque generated between a flux field and a rotating magnetic field, comprising:

means for generating the flux field; and means for forming the rotating magnetic field with respect to the flux field, wherein said means for generating the flux field includes an annular field magnet having ten magnetic poles with surfaces alternately arranged in a ring-shaped form along a circumferential orientation and magnetically bonded to each other in a radial orientation, each having an opposing polarity with respect to adjacent magnetic poles, and wherein said means for forming the rotating magnetic field includes an armature core having nine salient-poles at regular intervals from the circumference opposing the surfaces of the magnetic poles of the annular field magnet, and having nine slots each formed between adjacent salient-poles, and having a plurality of armature windings wound around each of the salient-poles with at least one winding, wherein said plurality of armature windings are divided into three groups of windings wound around three consecutive of said nine salient-poles of said armature core.

2. A brushless DC motor as claimed in claim 1, wherein said means for forming the rotating magnetic field is positioned within said annular field magnet.

3. A brushless DC motor which generates power from the torque generated between a flux field and a rotating magnetic field, comprising:

means for generating the flux field; and means for forming the rotating magnetic field with respect to the flux field, wherein said means for generating the flux field includes an annular field magnet having ten magnetic poles with surfaces alternately arranged in a ring-shaped form along a circumferential orientation and magnetically bonded to each other in a radial orientation, each having an opposing polarity with respect to adjacent magnetic poles, and wherein said means for forming the rotating magnetic field includes an armature core having nine salient-poles at regular intervals from the circumference opposing the surfaces of the magnetic poles of the annular field magnet, and having nine slots each formed between adjacent salient-poles, and having a plurality of armature windings wound around each of the salient-poles with at least one winding, wherein said plurality of armature windings are divided into three groups of windings wound around three consecutive of said nine salient-poles of said armature core, and connected in three phases to permit voltages of different phases to be applied to the respective groups of windings.

4. A brushless DC motor as claimed in claim 3, wherein said three groups of windings form a Y connection.

5. A brushless DC motor which generates power from the torque generated between a flux field and a rotating magnetic field, comprising:

a flux generator generating the flux field, and including an annular field magnet having ten magnetic poles with surfaces alternately arranged in a ring-shaped form along a circumferential orientation, each having an opposing polarity with respect to adjacent magnetic poles; and a magnetic field generator generating the rotating magnetic field with respect to the flux field, and including an armature core having nine salient-poles and nine slots each formed between adjacent salient-poles, and having a plurality of armature windings wound around at least one of the salient poles with at least one winding, wherein said plurality of armature windings are divided into three groups of windings wound around three consecutive of said nine salient-poles of said armature core.

6. A brushless DC motor which generates power from the torque generated between a flux field and a rotating magnetic field, comprising:

a flux generator generating the flux field, and including an annular field magnet having ten magnetic poles with surfaces alternately arranged in a ring-shaped form along a circumferential orientation, each having an opposing polarity with respect to adjacent magnetic poles; and a magnetic field generator generating the rotating magnetic field with respect to the flux field, and including an armature core having nine salient-poles and nine slots each formed between adjacent salient-poles, and having a plurality of armature windings wound around at least one of the salient poles with at least one winding, wherein said plurality of armature windings are divided into three groups of windings wound around three consecutive of said nine salient-poles of said armature core, and connected in three phases to permit voltages of different phases to be applied to the respective groups of windings.

7. A brushless DC motor as claimed in claim 6, wherein said three groups of windings form a three phase Y connection.

8. A brushless DC motor as claimed in claim 5, wherein said plurality of armature windings are connected in phases to permit voltages of different phases to be applied to said plurality of armature windings, and wherein a first phase to which current should initially be provided for starting the rotation of the motor is different depending on a position of a rotor of the motor.

9. In a brushless DC motor having a rotor which generates power, a method of generating the power, comprising the steps of:

(a) generating a flux field using an annular field magnet having ten magnetic poles with surfaces alternately arranged in a ring-shaped form along a circumferential orientation, each having an opposing polarity with respect to adjacent magnetic poles, and (b) generating a magnetic field with respect to the flux field using an armature core having nine salient-poles and nine slots each formed between adjacent salient-poles, and having a plurality of armature windings wound around at least one of the salient-poles with at least one winding, wherein said generating step (b) further comprises the step of dividing the plurality of armature windings into three groups of windings wound around three consecutive of said nine salient-poles of said armature core.

10. A method as claimed in claim 9, wherein said generating step (b) further comprises the step of connecting the three groups of windings in three phases to permit voltages of different phases to be applied to the respective groups of windings.

11. A method as claimed in claim 9, wherein said generating step (b) further comprises the step of connecting the three groups of windings to form a three phase Y connection.

12. A method as claimed in claim 9, wherein said generating step (b) further comprises the step of connecting the plurality of armature windings in phases to permit voltages of different phases to be applied to said plurality of armature windings.

13. A method as claimed in claim 12, wherein said generating step (b) further comprises the step of connecting the plurality of armature windings in a first phase for starting the rotation of the rotor, the first phase dependent on an initial rotor position.

14. A brushless DC motor which generates power from the torque generated between a flux field and a rotating magnetic field, comprising:

a flux generator generating the flux field, and including an annular field magnet having magnetic poles with surfaces alternately arranged in a ring-shaped form along a circumferential orientation, each having an opposing polarity with respect to adjacent magnetic poles; and a magnetic field generator generating the rotating magnetic field with respect to the flux field, and including an armature core having salient-poles and slots each formed between adjacent salient-poles, and having a plurality of armature windings wound around at least one of the salient-poles with at least one winding, said plurality of armature windings are divided into groups of windings wound around consecutive of said salient-poles of said armature core, and connected in three phases forming a three phase Y connection to permit voltages of different phases to be applied to the respective groups of windings, wherein said plurality of armature windings are divided into three groups of windings wound around three consecutive of said nine salient-poles of said armature core.

15. A method as claimed in claim 10, wherein said generating step (b) further comprises the steps of:

detecting the position of said field magnet using a counter electromotive force waveform induced from each of said plurality of armature windings upon rotation of said motor; and commuting current flowing direction in said plurality of armature windings of each of said three phases whenever said field magnet rotates a 12° interval.

* * * * *